United States Patent
Wang

(10) Patent No.: US 7,627,719 B2
(45) Date of Patent: Dec. 1, 2009

(54) CACHE DEVICE AND METHOD FOR DETERMINING LRU IDENTIFIER BY POINTER VALUES

(76) Inventor: Deyuan Wang, 100-5-3, Wanyuandongli, Tongdingmenwai Donggaodi, Fengtai District, Beijing, 100076 P.S. (CN)

( * ) Notice: Subject to any disclaimer, the term of this patent is extended or adjusted under 35 U.S.C. 154(b) by 383 days.

(21) Appl. No.: 11/597,494

(22) PCT Filed: Feb. 18, 2005

(86) PCT No.: PCT/CN2005/000199

§ 371 (c)(1), (2), (4) Date: Nov. 22, 2006

(87) PCT Pub. No.: WO2006/000138

PCT Pub. Date: Jan. 5, 2006

(65) Prior Publication Data

US 2007/0233958 A1 Oct. 4, 2007

(30) Foreign Application Priority Data

Jun. 29, 2004 (JP) ............................. 2004-190856

(51) Int. Cl.
*G06F 12/00* (2006.01)
(52) U.S. Cl. ........................ 711/136; 711/133
(58) Field of Classification Search ................. 711/136, 711/133
See application file for complete search history.

(56) References Cited

U.S. PATENT DOCUMENTS

| 4,322,795 A | * | 3/1982 | Lange et al. ................. 711/136 |
| 5,490,259 A | | 2/1996 | Hiraoka et al. |
| 5,701,426 A | * | 12/1997 | Ryan ............................. 711/3 |
| 6,219,760 B1 | * | 4/2001 | McMinn ..................... 711/137 |
| 6,754,776 B2 | | 6/2004 | Conway et al. |
| 2004/0006669 A1 | | 1/2004 | Endo et al. |
| 2005/0071564 A1 | * | 3/2005 | Luick ......................... 711/121 |
| 2005/0080995 A1 | | 4/2005 | Davis et al. |

FOREIGN PATENT DOCUMENTS

| CN | 1499382 A | 5/2004 |
| CN | 1607510 | 4/2005 |
| JP | 2004-038807 | 2/2004 |

* cited by examiner

*Primary Examiner*—Christian P Chace
*Assistant Examiner*—Hashem Farrokh
(74) *Attorney, Agent, or Firm*—Patterson, Thuente, Skaar & Christensen, P.A.

(57) ABSTRACT

The invention provides a cache device and method for performing a cache process on a cache memory having a high capacity in a high speed. The cache processing section performs a cache process composed of two-stage processes, a query process (P1) and a subsequent process (P2). In the query process (P1), the respective index tables and the identifier table are used to query whether the target identifier is present in the cache memory at a step (S101). If it is present, a data address of the target identifier in the cache memory is transmitted to the CPU. Otherwise, a data address of an identifier for a previously prepared ultimate LRU in the cache memory is transmitted to the CPU at a step (S102). In a subsequent process (P2), adjustment operations for the respective tables, regarding insertion of an identifier for a new data and deletion of the identifier for the ultimate LRU data, are performed at a step (S201).

7 Claims, 7 Drawing Sheets

CACHE DEVICE AND METHOD FOR DETERMINING LRU IDENTIFIER BY POINTER VALUES

RELATED APPLICATIONS

This application claims priority to PCT Application No. PCT/CN2005/000199 filed Feb. 18, 2005, and Japanese Application No. 2004-190856 filed Jun. 29, 2004, the disclosures of which are hereby incorporated by reference in their entireties.

FIELD OF THE INVENTION

The invention relates to a device and a method for performing a cache process on data. More specifically, according to the cache device and the method in the invention, a higher utilization ratio for a cache memory than the prior art can be obtained, and a cache process can be performed in a high speed with regard to a high capacity cache memory. Further, the invention relates to a cache device and a method for performing high speed data write and read between a host and a storage device.

BACKGROUND OF THE INVENTION

Generally, as compared with a processing speed for a CPU or host, a data write and read speed between the CPU or host and an external main storage medium is low. However the capability for the CPU or host is improved, therefore, the data write and read speed with the external main storage medium becomes a bottleneck for effecting on a high speed trend of the overall system.

In order to solve the problem, in the prior art, a local cache memory is provided between the CPU and the external main storage medium. Although the cache memory has a low capacity than the external main storage medium, a write and read can be performed in a higher speed in the cache memory. An overall processing speed can be improved by storing data read ever from the external main storage medium thereat.

Generally, the data write and read between the CPU and the external main storage medium are performed in a data unit composed of multiple bytes, that is, in a unit such as a block or a line. The block has an address composed of multiple bits, which is a data address for data in the external main storage medium.

As an example for the data write and read between the cache memory and the external main storage medium, it adopts an n-Way Set Associative mode in a Japanese patent (Publication number 2004-38807). As disclosed in the publication, the cache memory is composed of multiple ways, each of which is composed of multiple blocks. Moreover, an index of location for each of the blocks in the way is given to each of the blocks in the way. As for the cache memory, a few lower bits a1 of the data address for the data are used as the index, and a few upper bits a2 are used as an identifier for the data. Therefore, the block in the cache memory is made in correspondence with the data in the external main storage medium, on a basis of the data address for the external main storage medium.

In the method, the data having the same few lower bits a1 of the address, i.e., the data having the same index, can be placed in different ways. A number of the data having the same index as many as the number of the ways can be placed. If new data having the same index beyond the number of the ways is to be placed, however, data are selected and deleted from the data having the same index placed in the respective ways, by using a method such as LRU (Least Recently Used), and is then replaced with the new data. At this time, even though there is an empty block in other index space or spaces, it is impossible to place the new data thereat since the few low bits a1 of the data address for the data in the external main storage medium are assigned to a specific index in the cache memory, and are limited to such a place. In the method, even though there is an empty place in view of the overall cache memory, a condition that the data in the cache memory has to be deleted in order to place the new data would occur, causing a reduced utilization ratio for the storage space of the cache memory.

As another method, all of the blocks in the cache memory can be used as the ways. Therefore, the data in the external main storage medium will not be limited to the specific place in the cache memory, so that all of the data can be placed on any place in the cache memory. On condition of the same capacity for the cache memory and the same capacity for the block, as compared with the aforementioned method, a processing time upon querying an identifier would be dramatically increased due to a dramatic increase of the number of the identifiers in this method.

SUMMARY OF THE INVENTION

In order to solve the above problems, one of the aims of the invention is to provide a cache device and method capable of performing a cache process on even a cache memory having a high capacity in a high speed. It further provides a cache processing device and method having a higher memory space utilization ratio than the conventional cache memory.

In order to achieve the above aims, the invention provides a cache device which comprises a module for performing a query on identifiers for data stored in a cache memory; a module for outputting an address of a hit identifier if a query result is hit, and outputting an address of a previously prepared LRU identifier if it is not hit; and a module for determining an LRU identifier at a current timing, for a next time query.

According to an embodiment, the cache device further comprises a module for storing pointer values in an increment sequence of data write and read in correspondence with identifiers for data to be written and read, each time when the data are written and read; and a module for determining the LRU identifier by the pointer values, and modifying all the pointer values when the maximum value of all the pointer values reaches a given value.

In order to achieve the above aims, the invention also provides a cache method which comprises: a process for performing a query on identifiers for data stored in a cache memory; a process for outputting an address of a hit identifier if a query result is hit, and outputting an address of a previously prepared LRU identifier if it is not hit; and a process for determining an LRU identifier at a current timing, for a next time query.

According to an embodiment, the cache method further comprises the following processes: storing pointer values in an increment sequence of data write and read in correspondence with identifiers for data to be written and read, each time when the data are written and read; and determining the LRU identifier by the pointer values, and modifying all the pointer values when the maximum value of all the pointer values reaches a given value.

According to a further embodiment, the cache method further comprises: a process for setting a global pointer having a global pointer value corresponding to the current timing, and assigning the current pointer value of the global pointer to the stored pointer values in correspondence with the data to be written and read; a process for incrementing the global pointer value of the global pointer by 1; and a process for performing a shift process by subtracting a given value from the value of the global pointer and all the pointer values stored in correspondence with the data, when the global pointer value reaches a given value. In a specific embodiment, the shift process is performed separately and sequentially.

According to a further embodiment, the pointer values are grouped into an MRU group for large pointer values, an LRU group for small pointer values, and intermediate group for pointer values between those of the MRU group and those of the LRU group, based on the magnitudes for the stored pointer values. When an identifier in the MRU group is hit, a pointer value for the hit identifier is not updated. When an identifier in the intermediate group or the LRU group is hit, a pointer value for the hit identifier is updated, and the least pointer value of the pointer values for the MRU group is shifted to the intermediate group.

According to a further embodiment, the cache method further comprises: a process for storing the pointer values as an LRU table by using the respective identifiers for the data, and dividing the LRU table into sub LRU tables having the same size; a process for extracting the least pointer values from the respective sub LRU tables, and forming an intermediate LRU table by using the extracted pointer values; a process for dividing the intermediate LRU table into intermediate sub LRU tables having the same size; and a process for re-extracting the least pointer values from the respective intermediate sub LRU tables to form a next intermediate LRU table, which is repeated until the identifier for an ultimate LRU is extracted.

According to a further embodiment, the cache method further comprises: a process for updating only a table associated with the changed pointer value among the sub LRU tables and the respective intermediate sub LRU tables, when a certain one of the pointer values for the LRU table is updated through a data write and read.

In the above cache device and the method according to the invention, the identifier for the ultimate LRU, that is, the identifier for the least recently used data in the cache memory, can be queried in a high speed. Further, since all the blocks in the cache memory according to the invention are always in use, the hit rate for the cache memory can be improved. Therefore, it provides a cache device and method for performing a cache process on a high capacity cache memory containing a large number of identifiers in a high speed, and implementing a high hit rate.

Therefore, when the invention is applied to a medium such as a disc array, a DVD array which has a large over head, the speed for data write and read can be remarkably improved. Further, when the invention is applied to a network system and the like in which the same external main storage medium is accessed from a plurality of clients, a low cost would be taken to create a high speed processing system. Furthermore, a high speed query method such as CAM (Content Addressed Memory) can be used in the invention, to further improve the speed of the system.

DETAILED DESCRIPTION OF THE INVENTION

Figure 1:
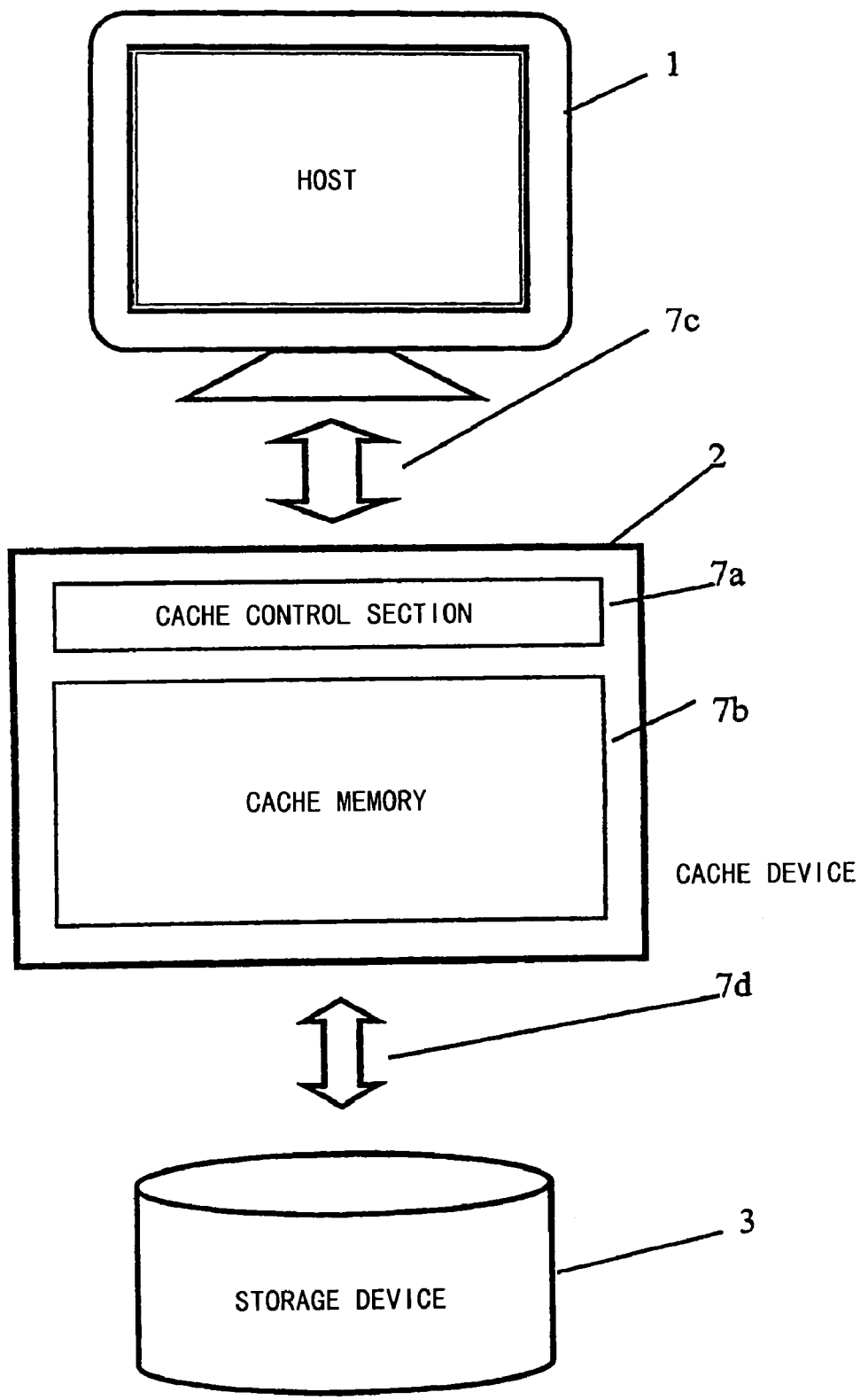
FIG. 1 is a diagram for illustrating an outline of the system according to an embodiment of the invention.

The embodiment of the invention will be described hereinafter in connection with the drawings. FIG. 1 is a schematic diagram for illustrating a system using the invention. Reference numeral 1 indicates a host such as a PC or a workstation which issues data write and read commands. Reference numeral 2 indicates a cache device composed of a cache control section 7a and a cache memory 7b. Reference numeral 3 indicates a storage device, serving as an external main storage medium such as a disc array and a DVD array for saving data. The cache device 2 functions for exchanging data between the host 1 and the storage device 3. Data exchange with the host 1 is performed via a host interface 7c, and data exchange with the storage device 3 is performed via a target interface 7d.

When the host 1 issues a data write command, the cache device 2 receives data transmitted from the host 1, and writes the data into the storage device 3. Meanwhile, the data are stored into the cache memory 7b in the cache device 2, as MRU (Most Recently Used) data.

On the contrary, when the host 1 issues a data read command, the cache device 2 firstly determines whether desired data are stored in the cache memory 7b or not. If the desired data are present, the cache device 2 immediately transmits the data to the host 1. The data are then considered as an MRU data until now, and is stored continually as a new MRU data in the cache memory 7b in position of the current MRU data. If no desired data are present in the cache memory 7b, the cache device 2 obtains the data via the storage device 3, and stores the data as a new MRU data into the cache memory 7b. The data are then transmitted to the host 1. If there is no free storage space in the cache memory 7b when the new data are stored into the cache memory 7b, however, data which should be cleared from the cache memory are selected from the Least Recently Used data (LRU data) stored in the cache memory 7b, and are replaced by the new data for storage.

As above, main operations for the cache device 2 shown in FIG. 1 are described. The cache device 2 stores the data in the cache memory 7b, and performs a process on the data (that is, cache process) to thereby implement a high speed system. The cache process is implemented by an identifier obtained from the few bits of the data address for the data. The details regarding the use of the identifier for the cache process will be described hereinafter.

Figure 2:
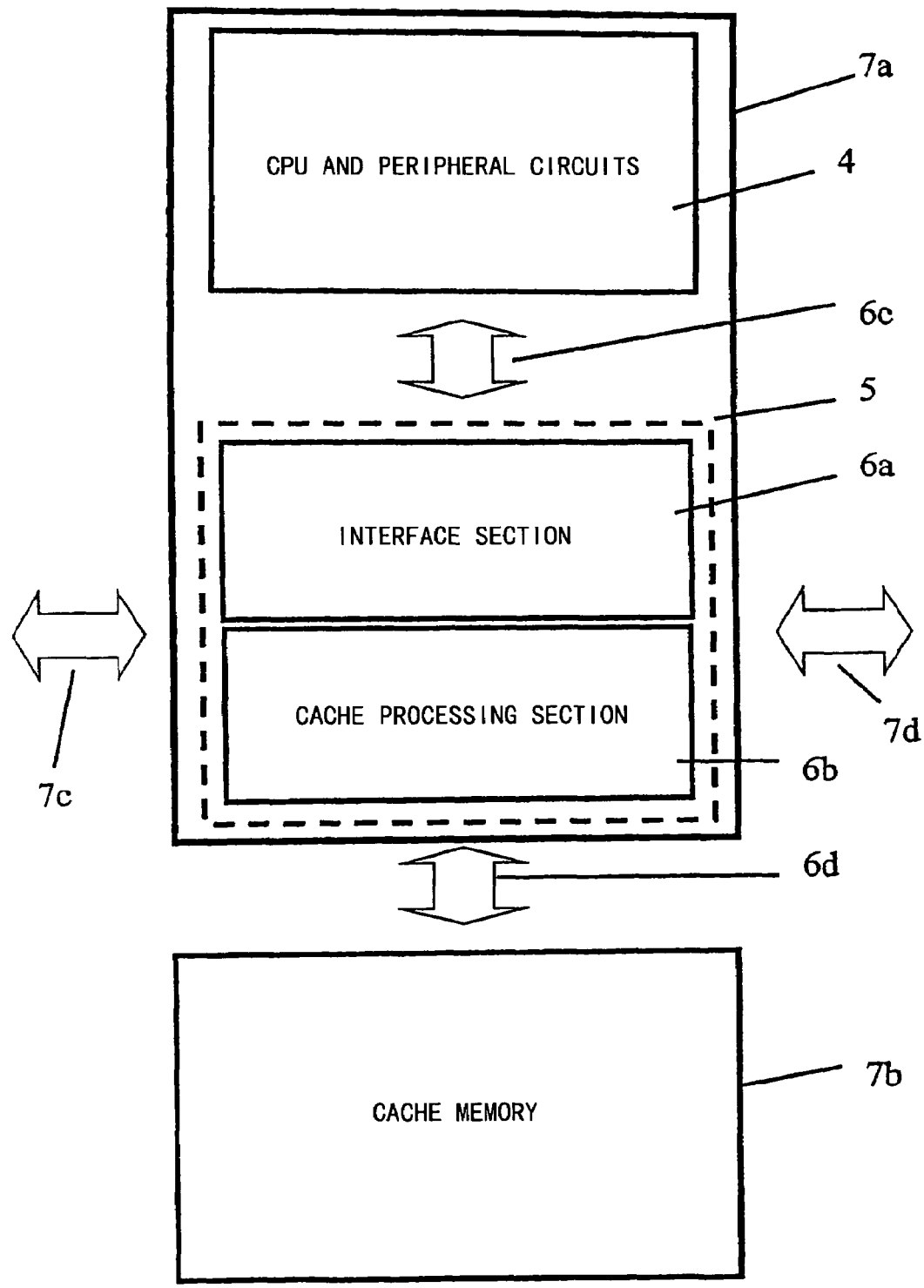
FIG. 2 is a diagram for illustrating a detailed structure for a cache processing device according to the embodiment of the invention.

FIG. 2 is a diagram for illustrating the detailed structure of the cache device 2. The cache memory 7b in the cache device 2 comprises a CPU and its peripheral circuits indicated by reference numeral 4 (hereinafter, referred as "CPU4"), and a control circuit indicated by reference numeral 5. The control circuit 5 comprises an interface section 6a for data exchange, and a cache processing section 6b which will be described later in detail.

The cache device 2 transmits write and read commands from the host 1 to the CPU4 via a host interface 7c, the interface section 6a and an interface 6c. The CPU4 transmits a cache processing command to the cache processing section 6b via the CPU interface 6c and the interface 6a based on this write and read command. The cache processing section 6b performs a cache process based on this cache processing command, and then transmits a cache processing result to the CPU4. The CPU4 then performs write and read controls on the host 1, the storage device 3 and the cache memory 7b, via the interface section 6a. Moreover, the control circuit 5 can be implemented by FPGA (Field Programmable Gate Array) and the like. Furthermore, although the control circuit is adopted in the embodiment, however, the invention is not limited thereto. For example, software can be adopted for implementing the function.

Figure 3:
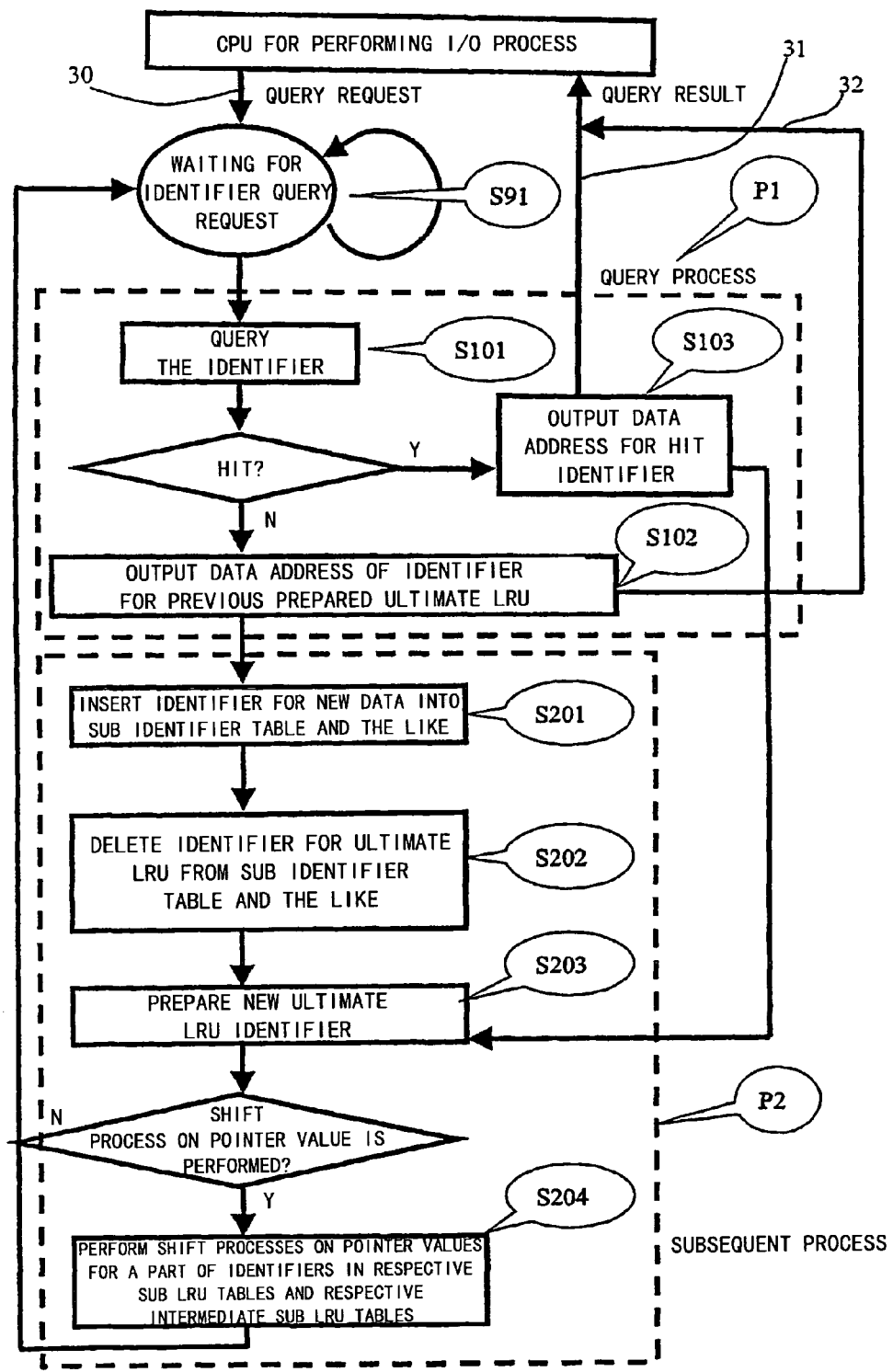
FIG. 3 is a diagram for illustrating a flow for a cache process performed by a processing section according to the embodiment of the invention.

FIG. 3 is a diagram for illustrating a flow for a cache process performed by the cache processing section 6b. As above, the CPU4 transmits a cache processing command to the cache processing section 6b. Here, the command is a request for a specified identifier (a query request as indicated by reference numeral 30 in the figure). The characteristic for the cache process performed by the cache processing section 6b in the invention consists in a two-stage process, composed of a query process P1 and a subsequent process P2 as enclosed by dash line in the figure. That is, in the query process P1, an identifier is queried in the cache memory 7b based on the query request. Query results indicated by reference numerals 31 and 32 are firstly transmitted to the CPU4. When the query results are transmitted to the CPU4, preparation for a next cache process is made in the subsequent process P2. These processes will be described in detail hereinafter.

Figure 4:
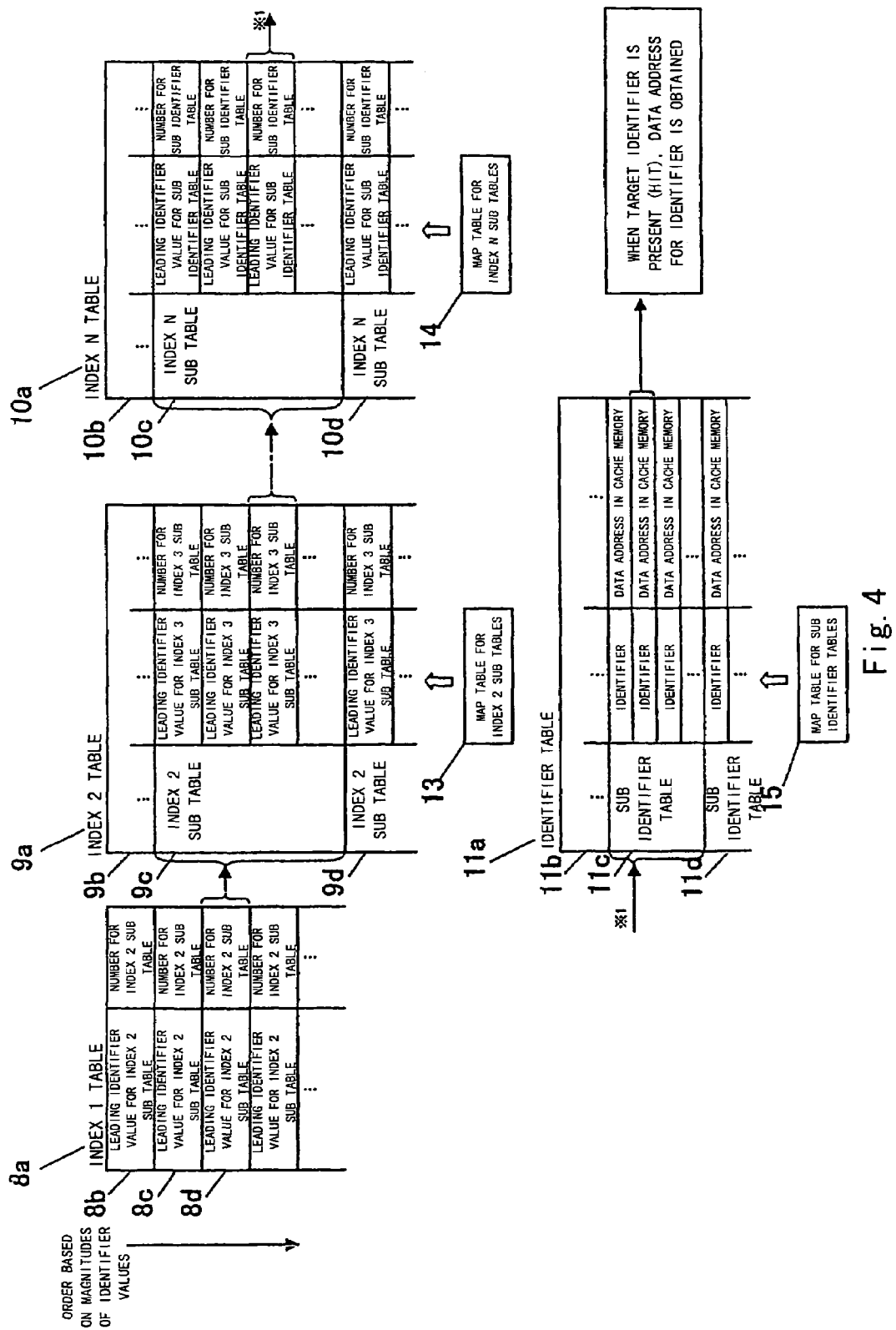
FIG. 4 is a diagram for illustrating an index 1 table, an index 2 table, an index n table, and an identifier table used in the cache process according to the embodiment of the invention.

FIG. 4 illustrates an index 1 table 8a, an index 2 table 9a, . . . , an index n table 10a, and an identifier table 11a used in the cache process. The query process P1 is performed by using these tables. The identifier table 11a is composed of a plurality of sub identifier tables 11b, 11c, 11d, . . . , having the same size. In order to query whether a query target identifier is present in the plurality of sub identifier tables 11b, 11c, 11d, . . . , a query is performed in an increasingly reduced range, by beginning with the index 1 table 8a, continuing with the next-stage index 2 table 9a and a further next stage, and ending with the index n table 10a.

The index 1 table 8a used in the query for the identifier in the increasingly reduced range is composed of a plurality of units 8b, 8c, 8d, . . . , which contain information for grouping the identifiers in the cache memory 7b based on the ranges in which their values are located. The conditions for grouping consist in distinguishing identifier values of the groups, using identifier values of the identifiers for the data in the cache memory, and making the number for the identifiers in the groups to be within a specified number. Therefore, the respective units 8b, 8c, 8d, . . . are composed of leading identifier values in the next stage index 2 sub tables 9b, 9c, 9d, . . . after the grouping, and numbers for index 2 sub tables 9b, 9c, 9d, . . . . Further, these units 8b, 8c, 8d, . . . are sorted based on the magnitudes of the identifier values. When the target identifier value is contained in a specified range shown by the respective units 8b, 8c, 8d, . . . , a query for the target identifier is performed in an increasingly reduced range, by obtaining the numbers for the sub tables of the index 2 table located in this range.

Next, the range is further reduced for the query by using the next stage index 2 table 9a. The index 2 table 9a is composed of a plurality of index 2 sub tables 9b, 9c, 9d, . . . . Similarly to the index 1 table 8a, these index 2 sub tables 9b, 9c, 9d, . . . are formed by a plurality of units, each composed of leading identifiers for the sub tables of the next stage index 3 table, and numbers for the index 3 sub tables. When the identifier value for the target identifier is contained in a specified range shown by the respective units of the sub tables of the index 2 table selected from the index 1 table 8a, numbers for the sub tables of the index 3 table located in the range can be obtained so that the range can be further reduced for the query of the target identifier.

As above, in order to query the target identifier, the query is performed in a step-by-step reduced range by beginning with the index 1 table 8a and ending with the index n table 10a. The index n table 10a is composed of a plurality of index n sub tables 10b, 10c, 10d, . . . . These index n sub tables 10b, 10c, 10d, . . . are formed by units, each comprised leading identifier values of the sub identifier tables 11b, 11c, 11d, . . . , and numbers for the sub identifier tables 11b, 11c, 11d, . . . . Therefore, the number for the sub table containing the identifier value for the target identifier value can be obtained so that the target identifier can be queried. Each of the identifiers in the sub identifier tables 11b, 11c, 11d, . . . is sorted in an order based on the magnitude of the identifier value, so that it is possible to query whether there is the target identifier herein, or not.

When the requested identifier is present (hit), the data address of the identifier in the cache memory 7b can be obtained. When the requested identifier is absent (missed), the tables in the identifier table 11a need to be adjusted. As above, the LRU data are replaced by the new MRU data through the cache process. Herein, the MRU data are inserted to a certain one of the sub identifier tables 11b, 11c, 11d, . . . of the identifier table 11a based on the magnitude of the identifier value for the MRU data. Further, the identifier for the data replaced by the new MRU data (i.e., the identifier for the LRU data) is deleted from the sub identifier table into which the identifier is written.

Generally, only the sub table 11a is adjusted as above. Since the sub identifier tables 11b, 11c, 11d, . . . will sometimes be increased or decreased through the adjustment to the table, however, it is necessary for the respective index tables to be adjusted. The increase or decrease of these tables can be managed by map tables 13, . . . , 14 and 15 corresponding to the respective tables.

The increase or decrease of the sub identifier tables 11b, 11c, 11d, . . . will occur on the following condition, that is, when the number of the identifiers in the sub identifier table into which the identifier of the MRU data are inserted goes beyond a given number. Herein, an unused identifier table is obtained from a map 15 for the sub table. Half of the identifiers in the sub table, the number of the identifiers in which overflows, are stored into this table. Therefore, one sub identifier table is added. In addition, when the number of the identifiers in the sub identifier table from which the identifier of the LRU data is deleted is equal to a given number, for example, only ¼ of the sub table, the number of the sub identifier tables will be decreased. Herein, the sub identifier table is merged with a sub identifier table logically adjacent thereto or having a leading identifier value most closely to that of the former sub identifier table. Therefore, a sub identifier table becomes an unused table. However, if the total number of the identifiers caused by the merge exceeds a prescribed number, the number of these identifiers after merge is divided into two half, which are respectively stored into two sub identifier tables. Therefore, the deletion operation on the identifier would not affect on the increase or decrease of the sub identifier tables.

Figure 5:
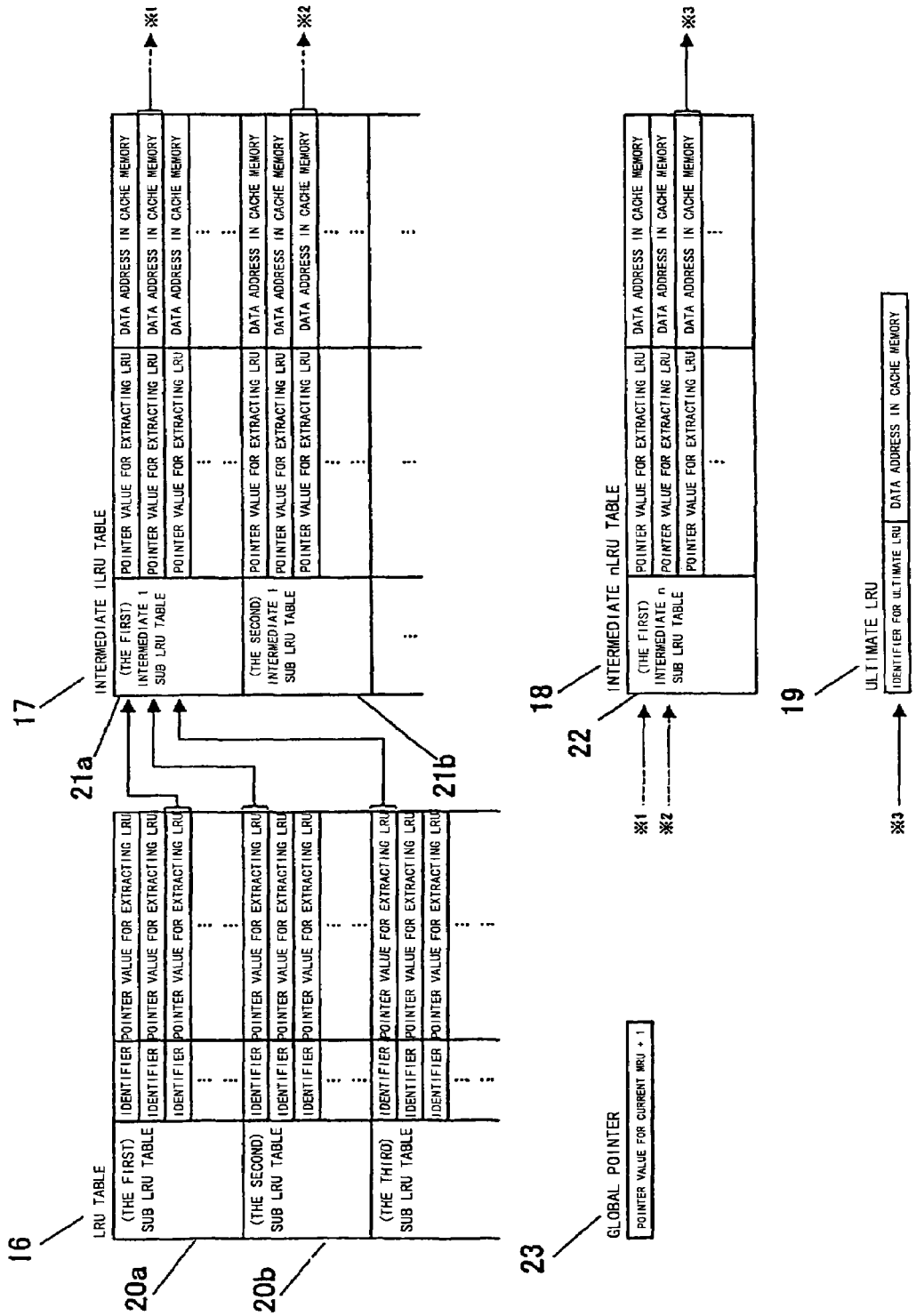
FIG. 5 is a diagram for illustrating an LRU table, an intermediate 1LRU table, and an intermediate nLRU table used in the cache process according to the embodiment of the invention.

The LRU table 16, the intermediate 1LRU table 17, and the intermediate nLRU table 18 used in the cache process are shown in FIG. 5. The tables are used for extracting an identifier for the least recently written or read data in the cache memory 7b, i.e., the identifier for the ultimate LRU19.

The LRU table 16 is formed by the identifiers for all the data stored in the cache memory 7b. These identifiers have pointer values necessary for extracting the LRU. The pointer value is one assigned to the data to be written or read, and is obtained from a global pointer indicated by reference sign 23 at a timing corresponding to the current timing in the cache process. The value of the global pointer 23 is always equal to the pointer value for the current-stage MRU incremented by 1. Those identifiers having this pointer value are divided into a plurality of sub LRU tables 20a, 20b, . . . having the same size, based on the given number. The LRU table 16 is formed by the plurality of the sub LRU tables 20a, 20b, . . . .

Identifiers having the least point values are extracted from the respective sub LRU tables 20a, 20b, . . . of the LRU table 16, in order to extract the identifier of the ultimate LRU19. They are then formed into the intermediate 1LRU table 17 integrally. The contents in the intermediate 1LRU table 17 are formed by the pointer values of the identifiers extracted from the LRU tables, and data addresses corresponding to the identifiers. The intermediate 1LRU table 17 is divided into a plurality of intermediate 1 sub LRU tables 21a, 21b, . . . having the same size. The least pointer values are re-extracted from the respective intermediate 1 sub LRU tables 21a, 21b, . . . . They are then formed into the intermediate 2LRU table integrally. As such, the query is performed in a stage-by-stage stepwise reduced range by beginning with the LRU table 16, and ending towards the intermediate nLRU table 18 having only one intermediate n sub LRU table 22, so as to extract the ultimate LRU19 and obtain an address and identifier of the ultimate LRU19 in the cache memory.

While extracting the ultimate LRU19, however, it is not necessary for the overall table to be adjusted each time. That is, when the ultimate LRU19 is to be extracted, it is sufficient to process the sub LRU table, the intermediate 1 sub LRU table, . . . , and the intermediate n sub LRU table in which a change occurs in the previous process.

For example, if the number of the identifiers is assumed to 1000, and the number of the identifier of the sub LRU tables 20a, 20b, . . . , and the respective intermediate sub LRU tables is assumed to 10, the number of the sub LRU tables 21a, 21b, . . . is 100, and the number of the intermediate 1 sub LRU tables 21a, 21b, . . . is 10. The number of the intermediate 2 sub LRU tables is therefore 1, from which the ultimate LRU19 is extracted. In this case, when the 15th identifier in the LRU table 16 is replaced by the identifier of the new MRU data, only the tables in which a change occurs are necessary upon extracting the new ultimate LRU19, that is, the (second) sub LRU table 20b, the (first) intermediate 1 sub LRU table 21a, and the intermediate 2 sub LRU table. The process on the three tables is performed as follow. An LRU1 having the least pointer value is extracted from the (second) sub LRU table 20b, and meanwhile, LRU2 and LRU3 having the least pointer values are extracted from the (first) intermediate 1 sub LRU table 21a and the intermediate 2 sub LRU table. The LRU1 is then written into the (first) intermediate 1 sub LRU table 21a, and comparison is performed between the LRU1 and LRU2. The less value is then written into the intermediate 2 sub LRU table, and is compared with the LRU3. The less value is just the least LRU, that is, the new ultimate LRU19.

Figure 6:
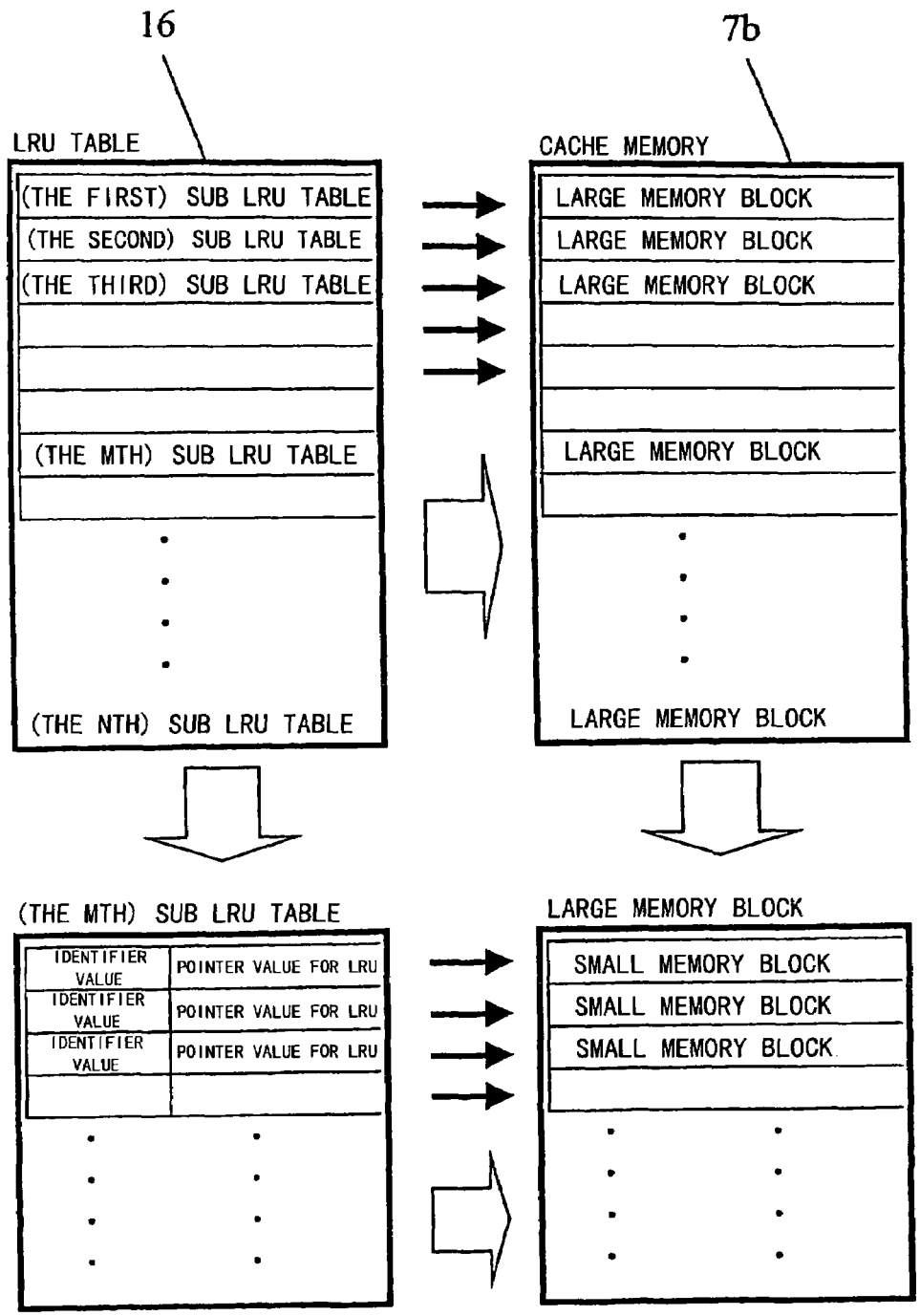
FIG. 6 is a diagram for illustrating a relationship between the LRU table and the cache memory according to the embodiment of the invention.

The relationship between the LRU table 16 and the cache memory 7b is shown in FIG. 6. As shown, the sub LRU table 20 of the LRU table 16 corresponds to a large memory block in the cache memory 7b, and data indicated by a certain identifier in the sub LRU tables 20a, 20b, . . . corresponds to a small memory block in the cache memory 7b.

For example, when an identifier indicates 64 KB data, the size of the small memory block is 64 KB. Meanwhile, if the size of the sub LRU table 20 is 10, the size of the large memory block is 640 KB. If the overall capacity of the cache memory 7b is 64 GB, the LRU table 16 is formed by 100,000 sub LRU tables 20.

Figure 7:
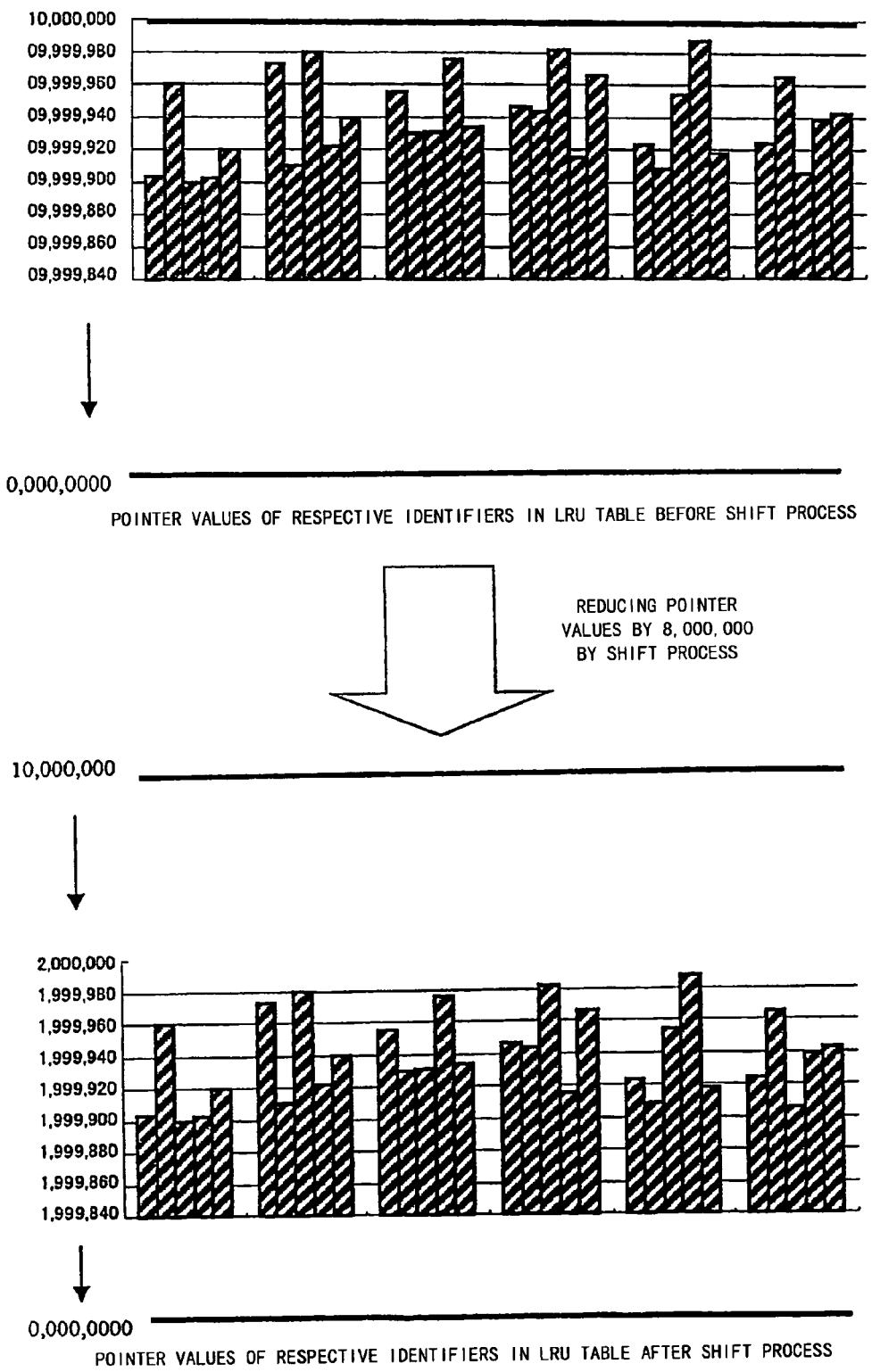
FIG. 7 is a diagram for illustrating pointer values before a shift process and after the shift process according to the embodiment of the invention.

The conditions for the pointer values before a shift process and after the shift process are shown in FIG. 7. The so-called shift process is one for reducing the value pointers of all the identifiers in the cache memory 7b to a given value, that is, replacing the identifier having the pointer value of the ultimate LRU19 into an identifier having the MRU pointer value by the cache process, so as to make the pointer values of the respective identifiers in the cache memory 7b always transit in an increment direction. In order to prevent the pointer value for the MRU from overflowing after a period of time, the process is performed periodically based on an upper limit of the pointer value for the MRU.

The process is performed on the respective sub LRU tables 20a, 20b, . . . , the respective intermediate 1 sub LRUs 21a, 21b, . . . , and . . . , and the intermediate n sub LRU table 22, in a unit of table. For example, after one cache process, the shift process on one of these tables is performed on a predetermined order. For this, when the pointer value is shifted from the shift-processed table to the un-shift-processed table upon extracting the ultimate LRU19, the pointer value is firstly returned to a value before the shift process and then proceeds. When the number of the identifiers in the LRU table 16 is 10000, and the number of the identifiers in the respective sub LRU table is 10, the number for the shift processes is 111. When the upper limit of the pointer value is assumed to 10,000,000, and the value for the shift is assumed to 8,000,000, 111 numbers of shift processes will be performed in the 8,000,000 numbers of cache processes.

Hereinafter, the flow for the cache process in the cache processing section 6b will be described in connection with FIG. 3. At the entry for the cache processing section 6b, a query request is waiting for a process at a step S91, and the query request 30 is received from the CPU4. Herein, the query request waiting process is repeated cyclically, and will enter a further process until the query request 30 is received. The query request 30 is received and a cache process is performed at the step S91. As aforementioned, the process is divided into a query process P1 and a subsequent process P2 for performing, according to the invention.

In the query process P1, identifiers satisfying the query request 30 from the CPU4 are performed a query process at a step S101. As aforementioned, the query is firstly performed on the respective index tables 8a, 9a, . . . , 10a and the identifier table 11a, to check whether there is a target identifier in the cache memory 7b.

When the target identifier is found (hit), the query result 31, that is, the data address of the target identifier obtained from the identifier table 11a in the cache address 7b is transmitted to the CPU4 at a step S103. It then proceeds to a step S203. If no target identifier is found (missed), a previously prepared query result 32, that is, the data address of the identifier for the ultimate LRU in the cache memory 7b is transmitted to the CPU4 at a step S102. In the cache process according to the invention, no matter whether the target identifier is present or not, a query result for the query request 30 is firstly transmitted to the CPU4 through the query process P1, and the subsequent process P2 prepared for a next time cache process is then performed, so the overall process for the system is performed in a high speed.

In the subsequent process P2, the identifier table 11a is firstly adjusted. At a step S201, as above, the identifier for the new data stored in the cache memory 7b is inserted into the identifier table 11a. At a step S202, the identifier for the LRU data replaced by the new data is deleted from the identifier table 11a. The respective tables are then adjusted, and it proceeds to a step S203.

At the step S203, the identifier for the ultimate LRU19 is prepared for the next time cache process. Further, even though the target identifier is hit in the query process P1, the process will be performed at the step S103. Herein, the identifier for the ultimate LRU19 is extracted by using the LRU table 16. After the process, it judges whether the pointer value for the MRU reaches a given reference value or not. If it is not reached, it returns to the entry for the cache process, that is, at the step S91. If it is reached, it proceeds to a step S204.

In the step S204, a shift process is performed on the pointer value. That is, before the continuously incrementing pointer value overflows, as above, the shift process is performed in a decrement direction of the pointer value. If no identifier is hit, or only the LRU identifier is hit in the cache process, however, the difference between the pointer value for the MRU and that for the LRU in the LRU table 16 is equal to the number of the identifiers in the LRU table 16. Only if the pointer value for the hit identifier is not equal to that for the LRU, however, this identifier will become a new MRU. The difference between the pointer value for the MRU and that for the ultimate LRU becomes greater than the number of the identifiers in the LRU table 16. The extreme example for this case consists in that if the identifier for the MRU and the identifier for the MRU-1 are hit repeatedly and alternatively, only these two pointer values are incremented. If a shift process is performed in this case, other pointer values becomes close to 0, or even less than 0.

In order to solve this problem, all the identifiers in the LRU table 16 are grouped. Different processes on the pointer values are performed with regard to different groups. That is, beginning with the pointer value for the MRU, the given numbers of the most recently used identifiers are added in order to form an MRU group. When the identifier in the MRU group is hit, the pointer value for the identifier will not be changed by the global pointer value 23. Further, for example, when the pointer value is shift-processed to be below 0 since it is constantly not hit, it is set to a zero pointer value. The identifiers having a pointer value of zero is formed into an LRU group. The identifiers in the LRU group are not prioritized. The ultimate LRU is selected based on a given sequence in the LRU table (such as physical sequence). Identifiers other than those in the LRU group and the MRU group are formed into an intermediate group. If the identifier in the LRU group or the intermediate group is hit, the pointer value for the identifier is changed by the global pointer value 23, so as to become a pointer value for a new MRU.

For example, it is assumed that the number of the identifiers is 1,000 and the number of the MRU groups is 500. When a certain identifier in the MRU group is hit, the pointer value for the identifier will not be updated to the pointer value for the new MRU. Herein, the pointer values for all the identifiers in the LRU table 16 will not be changed. The identifiers having pointer values less than the pointer value for the MRU by 500 or more are formed into the LRU group and the intermediate group. If these identifiers are hit, the pointer value for the identifier will be updated to the pointer value for the MRU, and the identifier will be added into the MRU group. Herein, the pointer values for the identifiers in the MRU group are continuous natural values. Therefore, the 500th identifier in the MRU group will automatically become a member of the intermediate group. When data which are originally absent in the cache memory 7b are added to the cache memory 7b, the data are replaced by the data for the LRU. Since the identifier for the data is one having the pointer value for the MRU, this identifier is added into the MRU group. For preparation for the next time cache process, the ultimate LRU is then extracted based on the given sequence in the LRU group (such as the physical sequence).

Further, in the embodiment of the invention, the cache device or the method for the same in the PC used as a host, the external main storage device used as a storage device, and the like are described. The invention, however, is not limited thereto. For example, the method of the invention can also be applied to a cache memory formed generally by SRAM (Static RAM (random access memory)) in the CPU and near the CPU. Furthermore, the method of the invention can also be applied to various software cache processes implemented on the main memory by the OS, such as a so-called map cache.

What is claimed is:

1. A cache device, comprising:
  a cache memory for storing data;
  a module for performing a query on identifiers for data stored in a cache memory;
  a module for outputting an address of a hit identifier if a query result is hit, and outputting an address of a previously prepared LRU identifier if it is not hit;
  a module for determining an LRU identifier at a current timing, for a next time query; and
  a module for storing pointer values in an increment sequence of data write and read in correspondence with identifiers for data to be written and read, each time when the data are written and read; and a module for determining the LRU identifier by the pointer values, and modifying all the pointer values when the maximum value of all the pointer values reaches a given value.

2. A cache method, comprising:
  a process for performing a query on identifiers for data stored in a cache memory;
  a process for outputting an address of a hit identifier if a query result is hit, and outputting an address of a previously prepared LRU identifier if it is not hit;
  a process for determining an LRU identifier at a current timing, for a next time query; and
  storing pointer values in an increment sequence of data write and read in correspondence with identifiers for data to be written and read, each time when the data are written and read; determining the LRU identifier by the pointer values, and modifying all the pointer values when the maximum value of all the pointer values reaches a given value.

3. The cache method as defined in claim 2, further comprising:
  a process for setting a global pointer having a global pointer value corresponding to the current timing, and assigning the current pointer value of the global pointer to the stored pointer values in correspondence with the data to be written and read;
  a process for incrementing the global pointer value of the global pointer by 1; and
  a process for performing a shift process by subtracting a given value from the value of the global pointer and all the pointer values stored in correspondence with the data, when the global pointer value reaches a given value.

4. The cache method as defined in claim 3, wherein the shift process is performed separately and sequentially.

5. The cache method as defined in claim 2, wherein the pointer values are grouped into an MRU group for large pointer values, an LRU group for small pointer values, and intermediate group for pointer values between those of the MRU group and those of the LRU group, based on the magnitudes for the stored pointer values, when an identifier in the MRU group is hit, a pointer value for the hit identifier is not updated; when an identifier in the intermediate group or the LRU group is hit, a pointer value for the hit identifier is updated, and the least pointer value of the pointer values for the MRU group is shifted to the intermediate group.

6. The cache method as defined in claim 2, further comprising:
- a process for forming the pointer values and the respective identifiers for the data into an LRU table, storing the LRU table, and dividing the LRU table into sub LRU tables having the same size;
- a process for extracting the least pointer values from the respective sub LRU tables, and forming an intermediate LRU table by using the extracted pointer values;
- a process for dividing the intermediate LRU table into intermediate sub LRU tables having the same size; and
- a process for re-extracting the least pointer values from the respective intermediate sub LRU tables to form a next intermediate LRU table, which is repeated until the identifier for an ultimate LRU is extracted.

7. The cache method as defined in claim 6, further comprising:
- a process for updating only a table associated with the changed pointer value among the sub LRU tables and the respective intermediate sub LRU tables, when a certain one of the pointer values for the LRU table is updated through a data write and read.

* * * * *